United States Patent [19]

Koller et al.

[11] Patent Number: 5,256,497
[45] Date of Patent: Oct. 26, 1993

[54] MAGNETIC TAPE CONTAINING ABRASIVES

[75] Inventors: Albrecht Koller, Munich; Hans-Heinrich Credner, Hohenschaeftlarn, both of Fed. Rep. of Germany

[73] Assignee: BASF Magnetics GmbH, Mannheim, Fed. Rep. of Germany

[21] Appl. No.: 720,060

[22] Filed: Jun. 24, 1991

[30] Foreign Application Priority Data

Jul. 12, 1990 [DE] Fed. Rep. of Germany ....... 4022221

[51] Int. Cl.$^5$ ............................ G11B 5/66; B32B 5/16
[52] U.S. Cl. ..................................... 428/694; 428/323; 428/328; 428/329; 428/336; 428/800
[58] Field of Search ............... 428/323, 328, 329, 336, 428/694, 900

[56] References Cited

U.S. PATENT DOCUMENTS

| | | | |
|---|---|---|---|
| 4,138,229 | 2/1979 | Tadokoro et al. | 51/398 |
| 4,379,800 | 4/1983 | Sato | 428/148 |
| 4,392,911 | 8/1983 | Akashi et al. | 428/323 |
| 4,716,076 | 12/1987 | Morioka et al. | 428/323 |
| 4,806,452 | 2/1989 | Hoffmann et al. | 430/306 |
| 4,837,083 | 6/1989 | Kuroda et al. | 428/900 |
| 4,847,182 | 7/1989 | Worns et al. | 430/309 |
| 4,913,959 | 4/1990 | Miyake et al. | 428/900 |
| 5,037,695 | 8/1991 | Yamada et al. | 428/694 |

FOREIGN PATENT DOCUMENTS

| | | |
|---|---|---|
| 2001489 | 10/1989 | Canada . |
| 2001490 | 10/1989 | Canada . |
| 2001491 | 10/1989 | Canada . |
| 355789 | 2/1990 | European Pat. Off. . |

OTHER PUBLICATIONS

U.S. Ser. No. 07/356,933 (corresponds to DE 29 08 764).
IEEE Transactions on Magnetics, vol. Mag—23, No. 1, Jan. 1987, pp. 103-105.

Primary Examiner—Paul J. Thibodeau
Assistant Examiner—Leszek Kiliman
Attorney, Agent, or Firm—Keil & Weinkauf

[57] ABSTRACT

It has been found that a magnetic tape which may be used in particular for video recording and which has excellent abrasive and cleaning properties for all those parts of the cassette or rather the recording and playback unit which come into contact with the magnetic layer can be obtained by addition of a non-magnetic powder having a Mohs' hardness of at least 9 and a primary particle size of 0.3 to 2 $\mu$m to the magnetic pigment, which has a BET surface of at least 26 m$^2$/g, in the magnetic dispersion, the magnetic layer of the magnetic tape having an Ra value of less than 0.02 $\mu$m. The best results were obtained with cubic Al$_2$O$_3$ particles added in a quantity of 1.1 to 4.4% by weight, based on the magnetic pigment.

3 Claims, 1 Drawing Sheet

MAGNETIC TAPE CONTAINING ABRASIVES

BACKGROUND OF THE INVENTION:

This invention relates to a magnetic tape having an abrasive and cleaning effect for those parts of the magnetic tape cassette and the recording/play-back unit which come into contact with the magnetic layer, consisting of a non-magnetic layer support and a dispersion layer applied thereto which contains hard magnetic pigments and non-magnetic pigments having a particle size of less than 2 $\mu$m and also polymeric binders and, optionally, other additives, such as dispersants, hardeners, plasticizers and lubricants.

When a magnetic recording medium, for example magnetic tape, is used over a prolonged period, abrasion occurs and the resulting dust builds up on the surface of the magnetic head. Dust from the environment can also build up on, and hence soils, the magnetic head. Deposits of this kind are one cause of reduced audio and video quality which leads inter alia to a fall in level during recording and playback. Another cause for the fall in level is so-called head degradation. This is attributable to the conversion of the substantially monocrystalline magnetic head surface into a polycrystalline state under the stress effect of the magnetic tape drawn over the magnetic head.

A general development objective in the production of magnetic tapes is to keep the percentage content of non-magnetic material in the storage layer as small as possible in order not to impair the magnetic properties.

However, where magnetic iron oxides—possibly doped with cobalt—are used as the storage particles, there are two reasons for using non-magnetic pigments in addition to the polymeric binder which is necessary for binding the magnetic pigments and for the mechanical running behavior of the magnetic tape, namely:

in many cases, the abrasion resistance of the magnetic layer is only made satisfactory by the addition of such non-magnetic pigments where the magnetic tape is used for video recording, the Mohs' hardness of the magnetic iron oxides is not sufficient to guarantee the necessary constant, but light polishing of the video magnetic heads made of ferrite. The addition of hard abrasives to the layer formulation makes it possible to establish a desirable minimal and uniform head abrasion which ensures good magnetic contact between tape and head. Corresponding formulations are known from US 3 630 910, US 4 379 800 and DE 39 10 488.

Where magnetic pigments of $CrO_2$ are used, the opposite situation arises, i.e. the heads are in danger of excessive abrasion by the magnetic pigment as a result of the considerable Mohs' hardness of that pigment. Attempts have been made to counteract this danger by using relatively soft inorganic pigments, such as ZnO, and/or by improved coating of the magnetic pigments with organic material, as known for example from Transactions on Magnetics, Vol.-Mag. 23, No. 1, January 1987, pages 103-105. Surface smoothing of the magnetic tape by calendering can also have a controlling effect in establishing the desired minimal head abrasion. From this point of view, the use of hard non-magnetic pigments is problematical where $CrO_2$ is used. DE 25 54 146 describes a process for cleaning the magnetic heads of a video recorder with a video monitor, the magnetic pigment being $CrO_2$ to which $Al_2O_3$, which is known to have a Mohs' value of 9, is added as non-magnetic pigment. A video test image is recorded on a correspondingly produced magnetic tape and the tape is loaded into the recorder to be cleaned and played until the test image is adequately reproduced. At this point, the recorder has to be stopped immediately and the test cassette removed. It is clear that this process is extremely critical and, unless carried out properly, leads to scratching of the video heads. This magnetic tape has an Ra value of 0.05 to 0.12 $\mu$m, i.e. is far too rough for use as a video tape.

In addition, U.S. Pat. No. 4,138,229 and U.S. Pat. No. 4,397,911 describe cleaning tapes for magnetic recording heads which do not contain a magnetic pigment, but rather inorganic pigments differing in hardness and particle diameter or mixtures of inorganic and organic polymer powders Irrespective of this, it has been found that a certain polishing effect is desirable not only for the video head. Partial abrasion is also useful for other parts coming into contact with the magnetic layer, above all the video cassette, because roughness peaks of such parts, for example tape guide elements or tape deflecting elements, can damage the touching magnetic layer, lead to visible and audible interference during play-back.

However, investigations have shown that roughness peaks of the type in question cannot be eliminated by the magnetic pigments because these pigments, which are used to store the signals, are made up of very fine particles to minimize signal interference and to ensure a high recording density. Although, given adequate hardness, fine-particle magnetic pigments of the type in question can have a light polishing effect on a part of the cassette coming into contact with the magnetic layer, troublesome and damaging roughness peaks are only significantly smoothed after relatively long running of the tape, so that the tape of a video cassette may possibly be scratched over its entire length, leading to malfunctions because, as already mentioned, longitudinal scratches—depending on their depth—can appear on the screen as long-lasting, visible and troublesome cross-streaks.

Although, as expected, this laborious light polishing is carried out more quickly by the relatively hard $CrO_2$ pigments than by the softer iron oxide particles, the process is nevertheless far too slow with both types of pigment, so that it is not possible to avoid damage to long sections of tape during transport in the video cassette. Accordingly, the pigments according to the prior art may only be used in conjunction with thoroughly premachined, smooth cassette components with which the magnetic tape comes into contact, resulting in a corresponding increase in the manufacturing costs of a video cassette.

SUMMARY OF THE INVENTION

Accordingly, the problem addressed by the present invention was to provide a magnetic tape of the type mentioned at the beginning which would develop a selective abrasive effect on roughness peaks without any significant increase in the abrasion of the video heads. In addition, the magnetic and mechanical properties of the magnetic tape would not be adversely affected.

It has surprisingly been found that the problem stated above was solved by a magnetic tape having an abrasive and cleaning effect for those parts of the magnetic tape cassette and the recording/play-back unit which come into contact with the magnetic layer, comprising a non-magnetic layer support and a dispersion layer applied thereto which contains hard magnetic pigments and non-magnetic pigments dispersed in a polymeric binder wherein the magnetic pigment is acicular $CrO_2$ having a BET value of at least 26 $m^2/g$ and the non-magnetic pigment has a Mohs' hardness of at least 9, an average particle size of 0.1 to 2 $\mu m$ and a BET value of 1 to 130 $m^2/g$ and the magnetic layer of the magnetic tape having an Ra value of less than 0.02 $\mu m$. Further particulars of the invention can be found in the subsidiary claims, the description and the drawings. By means of the invention, it is possible specifically to remove all troublesome roughness peaks touching the magnetic tape after only a brief running time until the problem has disappeared. At the same time, however, the effect of the additional abrasives on smooth contact surfaces (video head, tape deflection pin after removal of the roughness peak) is negligible compared with the light surface polishing effect of the magnetic $CrO_2$ particles. Accordingly, the invention embodies a self-regulating process which, after removal of the defect, comes automatically to a stop and could not have been expected in this form.

Accordingly, by addition of suitable non-magnetic pigments, as described in detail hereinafter, it is possible to use hard magnetic pigments of the $CrO_2$ type, which are of particular interest, for example, for the rapid thermal duplication of video programs, even in conjunction with inexpensive cassette components, such as metal tape deflection pins having a coarse surface texture, resulting in interference-free pictures for the end user and in economic advantages for the cassette manufacturer It is of course important to ensure that, when the non-magnetic pigments are added, no coarse particles enter the magnetic layer because otherwise the video heads could be scratched. Excessive fineness of the non-magnetic pigments should also be avoided so as not to impede the selective abrasion process.

It has also been found that it is possible with the magnetic tape according to the invention to obtain an excellent cleaning effect—with no danger of scratching—on different magnetic heads both for audio and for video magnetic tape recorders using different formats (3.81 mm, ¼ inch, 8 mm, ½ inch, Betacam, R-DAT, 1-inch, 2-inch).

DETAILED DESCRIPTION OF THE PREFERRED EMBODIMENTS

The dispersion is prepared by methods known per se. $CrO_2$ having a Mohs+ hardness of approximately 8 is preferably used as the magnetic pigment. The coercive force is preferably greater than 25 kA/m and the BET value is at least 26 $m^2/m$. Other hard magnetic pigments, for example acicular iron carbide or iron nitride, and mixtures of these pigments with $CrO_2$ may of course also be used for the purposes of the invention.

Figure 1:
FIG. 1 shows a scanning electron micrograph (20,000 X magnification) from which it can be seen how the cubic non-magnetic pigments are embedded in the magnetic layer containing acicular chromium dioxide particles.

These pigments are known, for example, from DE 35 12 270, DE 36 34 283, DE 36 34 487 EP 0 312 032, EP 0 340 689 and EP 0 227 104. Inorganic non-magnetic pigmants having a Mohs' hardness of at least 9, for example $Al_2O_3$ or chrome green, $Cr_2O_3$, may be used as so-called hard abrasives. These pigments have an average particle size of 0.1 to 2 $\mu m$ and preferably less than 1 $\mu m$ and a BET surface of 1 to 130 $m^2/g$ and preferably 5 to 25 $m^2/g$. SiC, garnet or $SiO_2$ particles may also be used in accordance with the invention. A cubic aluminum oxide pigment having an average primary particle size of 0.3 $\mu m$ has proved to be particularly suitable for the purposes of the invention. FIG. 1 shows a scanning electron micrograph (20,000x magnification) from which it can be clearly seen how the cubic non-magnetic pigments are embedded in the magnetic layer containing acicular chromium dioxide particles.

The polymeric binder used may be selected from any of the hard or soft binders—or mixtures thereof—typically used in magnetic tapes, such as for example copolymers of vinyl chloride, vinyl acetate and vinyl alcohol copolymers of vinylidene chloride and acrylonitrile, polyvinyl acetals, such as polyvinyl formal for example, or cellulose derivatives, such as nitrocellulose, and phenoxy resins and epoxy resins and also polyester polyurethanes, polyether polyurethanes, polycarbonate polyurethanes and others.

Suitable solvents for the binder may be any of the typical liquids known from the prior art, such as for example tetrahydrofuran, dioxane, dimethyl formamide, cyclohexanone, methyl ethyl ketone, toluene, methyl isobutyl ketone and others, optionally in admixture with one another.

Dispersion aids may be selected from a number of known surface-active compounds, such as for example fatty acid amines or diamines, fatty acid amides or diamides, fatty acids or ammonium salts thereof, lecithins, ethoxylated fatty acid derivatives, aliphatic or aromatic, optionally ethoxylated phosphoric acid esters, sulfosuccinic acid esters, sorbitan esters, aliphatic and aromatic sulfonic acids or sulfonates, fatty alcohol sulfates and others.

Other additives, including plasticizers, lubricants and hardeners, such as diisocyanates, and hardening accelerators of the type known from the prior art, may be used for the production of the magnetic recording layer.

The magnetic dispersion may be applied by knife coating, extrusion coating or cascade coating, the dry layer thickness of the magnetic layer preferably being 2 to 10 $\mu m$.

Films of polyesters, polyolefins, cellulose derivatives or polycarbonates may be used as the non-magnetic layer supports. After coating, the dispersion is dried in the usual way, followed by surface smoothing by calendering. To this end, the coated and dried layer support is drawn between two rollers, for example a heated metal roller and a plastic roller, under elevated pressure and at a surface temperature of 70 to 105° C. The magnetic tape thus produced is then cut to the required width and optionally made up into a cassette.

In the following Examples, all quantities are parts by weight. The magnetic dispersions are predispersed in a dispersion tank with a turbo mixer in the quantities shown in Table 1 and are subsequently ground in stirred ball mills filled with ceramic grinding elements 1 to 1.5 mm in diameter. The individual dispersions are then combined with a binder solution having the composition shown below and filtered. After addition of a cross-linking solution of 3.5 parts diisocyanate (Desmodur L, a product of Bayer AG) and 0.1 part iron acetyl acetonate dissolved in 6 parts tetrahydrofuran, the magnetic dispersions are applied in an extrusion coater to a 15 μm thick layer support of polyethylene terephthalate in a dry layer thickness of 2.5 μm, longitudinally oriented in the casting direction in a magnetic field, dried and calendered.

| Binder solution: | |
|---|---|
| Solvent | |
| tetrahydrofuran | 100 |
| cyclohexanone | 16 |
| Lubricant | |
| stearic acid | 6 |
| butyl stearate | 9 |
| Binder | |
| polyester urethane | 15 |
| polyvinyl chloride/vinyl acetate/vinyl alcohol copolymer (VAGH) | 4 |

$Al_2O_3$ pigments having an average particle size of 0.7 μm ("P10 feinst", a product of Alkor Chemie GmbH, Ludwigshafen) were used as the non-magnetic inorganic pigment in Examples 1, 2, 4, 5, 6 and 8; $Al_2O_3$ particles having an average primary particle size of 0.3 μm ("GE6", a product of Baikowski Chimie, Annecy, France) were used in Examples 3 and 7.

TABLE 1

| Example | 1 | 2 | 3 | 4 | 5 | 6 | 7 | 8 | Comparison Example | Comparison Example 2 |
|---|---|---|---|---|---|---|---|---|---|---|
| Solvent | | | | | | | | | | |
| tetrahydrofuran | 86 | 86 | 86 | 86 | 86 | 86 | 86 | 86 | 86 | 86 |
| cyclohexanone | 13 | 13 | 13 | 13 | 13 | 13 | 13 | 13 | 13 | 13 |
| Dispersant | 2.5 | 2.5 | 2.5 | 2.5 | 2.5 | 2.5 | 2.5 | 2.5 | 2.5 | 2.5 |
| lecithin | | | | | | | | | | |
| Pigments | | | | | | | | | | |
| chromium dioxide | 91 | 91 | 91 | 90 | 107 | 107 | 107 | 105 | 91 | 107 |
| —$Fe_2O_3$ | 16 | 16 | 16 | 15 | — | — | — | — | 16 | — |
| $Al_2O_3$ (P10 feinst) | 1 | 2 | — | 4 | 1 | 2 | — | 4 | — | — |
| $Al_2O_3$ (GE6) | — | — | 3 | — | — | — | 2 | — | — | — |
| Binder | | | | | | | | | | |
| polyvinyl chloride/vinyl acetate/vinyl alcohol | 3 | 3 | 3 | 3 | 3 | 3 | 3 | 3 | 3 | 3 |

To test the magnetic and mechanical properties, the materials are cut to a width of ½ inch (12.5 mm) and made up into 2-hour VHS cassettes (tape length=173 m).

The following tests were carried out:
1. measurement of the storage data by the standard method for VHS tapes,
2. measurement of head abrasion after 50 complete runs under normal climatic conditions in the cassette,
3. testing of the behavior of the magnetic tape towards inexpensive tape deflection pins.

Figure 2:
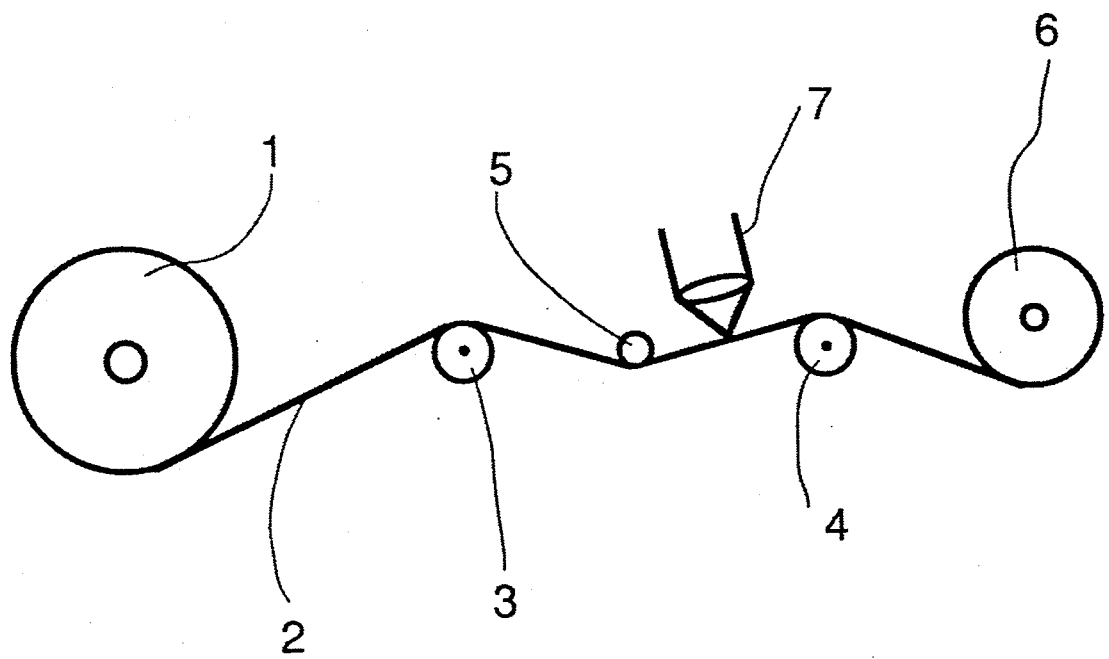
FIG. 2 is a graphical representation of an apparatus used to test the magnetic and mechanical properties of the magnetic tape.

This test was carried out as follows (cf. FIG. 2):

The magnetic tape (2) to be tested coming from a feed spool (1) was guided with its magnetic layer side through guide rollers (3,4) under defined tension over the already mentioned deflection pin (5) taken from a commercially available inexpensive cassette and wound onto a take-up spool (6) (tape speed: 5 mm/sec.). Using a stereo microscope (7) directed vertically onto the layer side between the deflection pin (5) and the roller (4), the length of tape after which the defects disappeared was visually observed in tangential light directed transversely of the tape. Using a video cassette containing inexpensive tape deflection pins of the same material, a parallel test was conducted to determine—on the basis of a recording test signal—the period of time after which the defects are no longer visible on a television screen.

TABLE 2

| | Signal-to-noise ratio | | End of tape damage after | Head abrasion |
|---|---|---|---|---|
| | dB | $dB_{rel}$ | m | μm |
| Example 1 | 52.3 | 0.2 | 1.6 | 3.4 |
| Example 2 | 52.2 | 0.1 | 0.9 | 3.8 |
| Example 3 | 52.0 | 0.2 | 1.1 | 3.3 |
| Example 4 | 51.9 | −0.2 | 0.6 | 4.0 |
| Example 5 | 53.0 | 0.9 | 1.2 | 4.4 |
| Example 6 | 52.8 | 0.7 | 1.0 | 4.9 |
| Example 7 | 52.6 | 0.6 | 1.2 | 4.3 |
| Example 8 | 52.7 | 0.6 | 0.7 | 5.3 |
| Comp. Ex. 1 | 52.1 | 0 | >173 | 3.4 |
| Comp. Ex. 2 | 53.0 | 0.9 | >173 | 4.5 |

As can be seen from Table 2, the defects disappear after only a short tape run in the case of Examples 1 to 8 according to the invention, but persist over the entire length of the tape in the case of Comparison Examples 1 and 2. The correlation between scratches visually observed with the microscope and the interference observed on the television screen was excellent. As can also be seen from Table 2, the addition of 1 to 4% aluminum oxide results in no deterioration in the luminance signal-to-noise ratio head abrasion values lying within the VHS specification of 0.5 to 6 μm per 100 hours running time but a significant improvement in presentation where inexpensive tape deflection pins are used, in other words rapid elimination of the interference caused by layer scratches.

The average roughness of the magnetic layer side (Ra value) was between 0.005 and 0.015 μm both in the magnetic tapes according to Examples 1 to 8 and in the magnetic tapes according to Comparison Examples 1 and 2, which is normal for commercially available magnetic video tape.

Additions of the hard non-magnetic pigment of 0.5 to 10% by weight, based on the magnetic pigment, and preferably 1 to 4% by weight are suitable for the purposes of the invention.

What is claimed is:
1. A magnetic tape having an abrasive and cleaning effect for those parts of a magnetic tape cassette and a recording/play-back unit which come into contact with the magnetic layer of the tape, comprising a non-magnetic layer support and a dispersion layer applied thereto which contains hard magnetic pigments and non-magnetic pigments of cubic $Al_2O_3$ dispersed in a polymeric binder, wherein one of the magnetic pigments is acicular $CrO_2$ having a BET value of at least 26 $m^2/g$, said acicular $CrO_2$ being present in an amount of at least 85% by weight of the magnetic pigments, said non-magnetic pigment having a Mohs+ hardness of at least 9, an average particle size of 0.3 to 2.0 $\mu m$, a BET value of 5 to 25 $m^2/g$, and being present in an concentration of 1.1–4.4% based on the weight of $CrO_2$, the magnetic layer of the magnetic tape having a surface Ra of less than 0.02 $\mu m$.

2. A magnetic tape as defined in claim 1, wherein the non-magnetic pigment is $Al_2O_3$ having an average particle size of less than 1 $\mu m$.

3. A magnetic tape as defined in claim 1, wherein the cubic $Al_2O_3$ has an average particle size of 0.3 $\mu m$.

* * * * *

UNITED STATES PATENT AND TRADEMARK OFFICE
CERTIFICATE OF CORRECTION

PATENT NO. : 5,256,497
DATED : Oct. 26, 1993
INVENTOR(S) : KOLLER et al.

It is certified that error appears in the above-identified patent and that said Letters Patent is hereby corrected as shown below:

IN THE CLAIMS

Claim 1, column 7, line 10, "Mohs+" should read -- Mohs'--.

Signed and Sealed this

Third Day of May, 1994

Attest:

BRUCE LEHMAN

Attesting Officer

Commissioner of Patents and Trademarks